US006257003B1

(12) United States Patent
Hipsky

(10) Patent No.: US 6,257,003 B1
(45) Date of Patent: Jul. 10, 2001

(54) ENVIRONMENTAL CONTROL SYSTEM UTILIZING TWO AIR CYCLE MACHINES

(75) Inventor: Harold Hipsky, Willington, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 0 days.

(21) Appl. No.: 09/632,481

(22) Filed: Aug. 4, 2000

(51) Int. Cl.[7] .................................. F25B 9/00; F25D 9/00
(52) U.S. Cl. .................................................... 62/88; 62/402
(58) Field of Search ............................. 62/401, 402, 87, 62/88

(56) References Cited

U.S. PATENT DOCUMENTS

| | | |
|---|---|---|
| 3,877,246 | 4/1975 | Schutze . |
| 4,262,495 | 4/1981 | Gupta et al. . |
| 4,550,573 | 11/1985 | Rannenberg . |
| 5,086,622 | 2/1992 | Warner . |
| 5,086,625 | 2/1992 | Momose et al. . |
| 5,473,899 | 12/1995 | Viteri . |
| 5,704,218 | 1/1998 | Christians et al. . |
| 5,860,283 | 1/1999 | Coleman et al. . |
| 5,887,445 | 3/1999 | Murry et al. . |
| 5,906,111 | 5/1999 | Lui . |
| 5,918,472 | 7/1999 | Jonqueres . |
| 6,070,418 | 6/2000 | Crabtree et al. . |
| 6,151,909 | * 11/2000 | Carter et al. ............................ 62/402 |

\* cited by examiner

Primary Examiner—William Doerrler

(57) ABSTRACT

An environmental control system and method are provided for conditioning water-vapor compressed air for supply as conditioned air. The environmental control system (8) includes two air cycle machines (9, 10) that rotate independent of each other. The air cycle machine (9) includes a turbine (11) that drives a fan (12), and the air cycle machine (10) includes a turbine (15) that drives a compressor (16). The environmental control system (8) further includes a primary heat exchanger (19) upstream of the compressor (16), a secondary heat exchanger (20) downstream of the compressor (16), are heater (21) downstream of the secondary heat exchanger (20), a condenser (22) downstream of the reheater (21), a water collector (24) downstream of the condenser (22), and three bypass control valves (28, 30, 32). In combination, the turbine (11), reheater (21), condenser (22), and water collector (24) form a dehumidification loop (34) for the environmental control system (8). In one mode of operation, the environmental control system (8) further compresses the compressed air in the compressor (16) and then dehumidifies the further compressed air in the dehumidification loop (34) before expanding the dehumidified further compressed air in the turbine (15) to cool the dehumidified further compressed air and to power the compressor (16) in the absence of rotating engagement between the turbine (15) and the turbine (11).

12 Claims, 1 Drawing Sheet

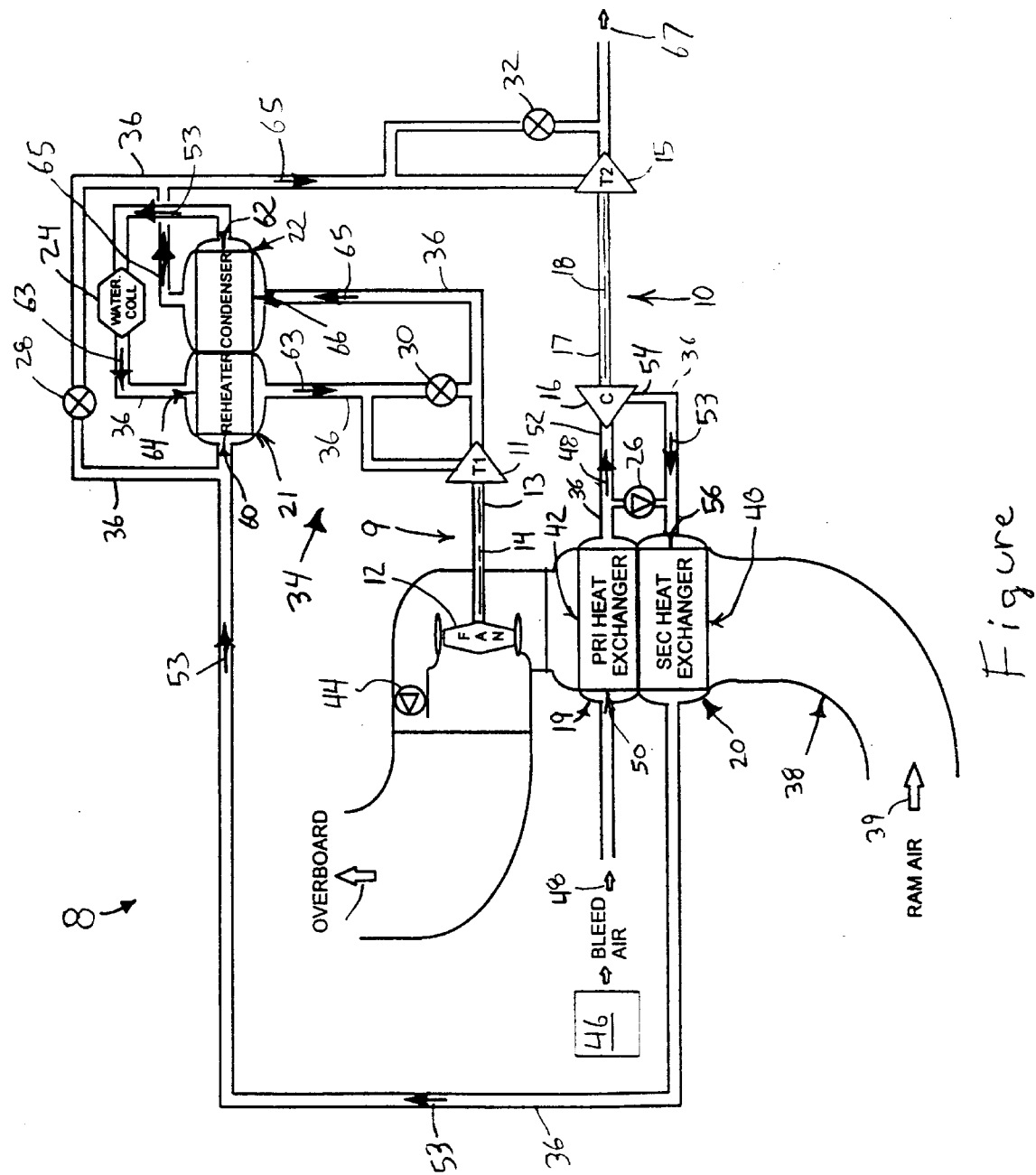
Figure

ENVIRONMENTAL CONTROL SYSTEM UTILIZING TWO AIR CYCLE MACHINES

FIELD OF THE INVENTION

This invention relates to environmental control systems, and more particularly, to air cycle environmental control systems that condition water-vapor bearing compressed air for supply as conditioned air.

BACKGROUND OF THE INVENTION

Air cycle environmental control systems that condition air are well-known for the cooling and/or pressurization of heat loads such as passenger cabins and equipment compartments in both commercial and military aircraft. These systems are popular for a number of reasons, including the substantial amount of cooling available from air cycle systems of relatively modest size, and the adaptability of such systems to gas turbine engine powered vehicles such as aircraft and military land vehicles such as battle tanks.

In a typical installation, compressed ambient air provided by either the compressor section of a main engine or the compressor section of an auxiliary power unit, or both, is expanded in an air cycle turbo machine to provide a cool, fresh air supply for one or more cabins and/or equipment compartments of a vehicle.

One known air cycle environmental control system that utilizes a compressor (36) and a fan (22) driven by a pair of turbines (24) and (26) via a common shaft (23) is disclosed in U.S. Pat. No. 5,086,622, issued on Feb. 11, 1992 to John L. Warner and assigned to the Assignee of the present application, the entire disclosure of which is incorporated herein by reference. In Warner's system, compressed air is cooled in a primary heat exchanger (16), compressed in the compressor (36), and then cooled again in a secondary heat exchanger (40). The fan (22) drives a cooling ambient air flow through the primary and secondary heat exchangers (16) and (40). After passing through the primary and secondary heat exchangers (16) and (40), the compressed air is then further cooled in a condenser (46) that dehumidifies the compressed air by condensing water-vapor from the compressed air. The dehumidified compressed air is then directed through the turbine (24) where it is expanded to provide power to the shaft (23) and to cool the compressed air so that it may be used as the coolant in the condenser (46). The compressed air is then further expanded through the turbine (26) to power the shaft (23) and to cool the compressed air so that it may be supplied to a cabin (62). While this system is more than satisfactory for a number of applications, such as for large commercial aircraft, it may not be the optimum system for all applications, such as for small regional aircraft.

U.S. Pat. No. 5,887,445 issued Mar. 30, 1999 to Murry et al. discloses another air cycle environmental control system (10) that utilizes two air cycle machines (39) and (40) that rotate independent of each other. The air cycle machine (39) includes a compressor (16) that is driven by a high pressure turbine (24), and the air cycle machine (40) includes a fan (32) that is driven by a low pressure turbine (28) to supplement a ram air flow through primary and secondary heat exchangers (12,13). The system (10) also includes a reheater (19), condenser (26), and water extractor (21) that dehumidify the bleed air flow to the high pressure turbine (24). While the system (10) of Murry et al. may satisfactorily perform its intended function, for certain applications operation of the system (10) with an optimum power split between the turbines (24) and (28) may require that, under normal operating conditions, the bleed air be expanded through the high pressure turbine (24) to a point where the condensed water in the condenser (26) freezes, thereby creating icing in the condenser (26). This may require that the condenser (26) be designed to accommodate such icing, which can increase the size, weight, cost, and complexity of the condenser (26).

SUMMARY OF THE INVENTION

It is a primary object of the invention to provide an improved air cycle environmental control system.

It is another object of the invention to provide dehumidification in an air cycle environmental control system that can be optimized under normal operating conditions without requiring a condenser that is designed for icing of the condensed water from the compressed air flow.

It is another object of the invention to provide an air cycle environmental control system that can efficiently provide an increased conditioned air flow in an aircraft at cruising altitudes.

Having expressly identified a number of objects, it should be understood that some manifestations of the invention may not achieve all of the expressly identified objects.

In accordance with one aspect of the invention, a method is provided for conditioning water-vapor bearing compressed air for a supply as conditioned air.

In one form, the method includes the steps of further compressing the compressed air in a compressor, condensing and removing water vapor from the further compressed air to dehumidify the further compressed air, expanding the dehumidified air through a first turbine to cool the dehumidified air to a first temperature, rejecting heat from said further compressed air to said expanded dehumidified air in said condensing step, and, after the rejecting heat step, further expanding the dehumidified air through a second turbine to cool the dehumidified air to a second temperature and to power the compressor in the further compressing step in the absence of rotating engagement between the first and second turbines. As one feature, the method further includes the step of selectively directing a majority of the further compressed air to the second turbine to be expanded therein without the majority of the further compressed air undergoing the condensing step and the step of expanding the dehumidified air through a first turbine.

In accordance with one form of the invention, the method includes the steps of using a first air cycle machine including a first turbine powering a fan, using a second air cycle machine including a second turbine powering a compressor, flowing the compressed air first through the compressor, second through the first turbine, and third through the second turbine in the absence of rotating engagement between the first and second air cycle machines. As one feature, the method further includes the step of selectively directing the majority of the compressed air flow from the compressor to the second turbine without flowing the majority of compressed air flow through the condenser and the first turbine.

In accordance with another aspect of the invention, an environmental control system is provided for conditioning water-vapor bearing compressed air for supply as conditioned air. The system includes a compressor to further compress the compressed air and to deliver the further compressed air to the system, a condenser downstream of the compressor to receive the further compressed air and to condense at least a portion of the water-vapor in the further compressed air to deliver dehumidified compressed air to the system, a first turbine downstream of the condenser to receive the dehumidified compressed air and to expand the dehumidified compressed air to cool the dehumidified compressed air, and a second turbine downstream of the first turbine to receive the expanded dehumidified compressed air. The second turbine is rotatable independent from rotation of the first turbine to further expand the expanded dehumidified compressed air to cool the expanded dehumidified compressed air and to power the compressor.

As one feature, the environmental control system further includes a fan powered by the first turbine to produce a cooling air flow, and at least one heat exchanger upstream of the first turbine to reject heat to the cooling air flow from at least one of the compressed air and the further compressed air.

As one feature, the environmental control system further includes a bypass valve upstream of the condenser and the first turbine to selectively bypass a majority of the further compressed air to the second turbine without first passing the majority of the further compressed air through the condenser in the first turbine.

Other objects, features, and advantages of the invention will become apparent from the following specification taken in connection with the accompanying drawing.

BRIEF DESCRIPTION OF THE DRAWING

The FIGURE is a schematic representation of an air cycle environmental control system embodying the invention.

DETAILED DESCRIPTION OF THE PREFERRED EMBODIMENTS

With reference to the FIGURE, an air cycle environmental control system 8 includes two air cycle machines 9 and 10 that rotate independent of each other, ie. in the absence of rotating engagement between the air cycle machine 9 and 10. The air cycle machine 9 includes a turbine 11 that drives a fan 12 through a common shaft 13 that mounts the turbine 11 and the fan 12 for rotation about an axis 14. The air cycle machine 10 includes a turbine 15 that drives a compressor 16 through a common shaft 17 that mounts the turbine 15 and compressor 16 for rotation about an axis 18. The environmental control system 8 further includes a primary heat exchanger 19 upstream of the compressor 16, a secondary heat exchanger 20 downstream of the compressor 16, a reheater 21 downstream of the secondary heat exchanger 20, a condenser 22 downstream of the reheater 21, a water collector 24 downstream of the condenser 22, a bypassing check valve 26, and three bypassing control valves 28, 30 and 32. As will be explained in more detail below, the reheater 21, the condenser 22, the water collector 24, the turbine 11 and the bypass control valve 30 define a dehumidification loop 34 of the environmental control system 8. Suitable conduits or air ducts 36 are provided to direct the compressed air flow between the various components of the environmental control system 8.

The fan 12, the primary heat exchanger 19, and the secondary heat exchanger 20 are positioned in an ambient air duct 38, such as a ram air duct of an aircraft, that directs a cooling air flow of ambient air 39 through coolant flow passages 40 and 42 of the secondary and primary heat exchangers 20 and 19, respectively. The fan 12 serves to draw the ambient air flow 39 through the passages 40 and 42. In circumstances where the ambient air flow 39 is a ram air flow, the fan 12 serves to supplement or increase the velocity of the ambient flow 39 through the cooling passages 40 and 42. In circumstances where there is no ram air flow, the fan 12 is the primary source for generating the velocity of the ambient air flow through the passages 40 and 42. In situations where the ram air flow provides a sufficient velocity for the flow of the ambient air through the passages 40 and 42, the fan 12 is not required to supplement the velocity and a bypass valve 44 is provided in the duct 38 to bypass the ambient air flow around the fan 12.

In one mode of operation of the environmental control system 8, water-vapor bearing compressed air 48 from a compressed air supply 46, such as bleed air from a compressor section of a gas turbine engine, is directed through a flow path 50 in the primary heat exchanger 19 where it is cooled by the ambient air 39 flowing through the cooling path 42. The flow path 50 directs the compressed air to an inlet 52 of the compressor 16. The compressor 16 further compresses the compressed air 48 and directs the further compressed air 53 through an outlet 54 to a flow path 56 through the secondary heat exchanger 20. The further compressed air 53 is cooled by the external ambient air flow 39 flowing through the cooling path 40 of the secondary heat exchanger 20. After it is cooled in the secondary heat exchanger 20, the further compressed air 53 is directed through a flow path 60 in the reheater 21 where it is further cooled before entering a flow path 62 in the condenser 22. In the condenser 22, the temperature of the further compressed air 53 is reduced to condense water-vapor from the further compressed air. This dehumidifies the further compressed air which is then directed, together with the condensed water to the water collector 24 which collects or extracts the condensed water from the flow. While the optimum amount of water-vapor extraction can vary from application to application, in many applications it will be desirable to extract at least a majority of the water-vapor from the further compressed air when the dehumidification loop 34 is active. The dehumidified further compressed air 63 is then directed through a coolant flow path 64 in the reheater 21 where the heat from the further compressed air 53 in the flow path 60 is rejected to the dehumidified further compressed air 63. Having recovered heat energy that was originally extracted in the reheater 21, the dehumidified further compressed air 63 is then expanded through the turbine 11 to power the fan 12 and to provide a cooled, expanded compressed air flow 65 to the system 8. Preferably, the reheater 21 is designed to reject a sufficient amount of heat to the dehumidified further compressed air 63 to vaporize any residual condensed water droplets that remain in the flow and to raise the temperature of the water-vapor in the flow to a sufficiently high temperature to prevent icing in the turbine 11. After exiting the turbine 11, the expanded compressed air 65 is directed through a coolant flow path 66 in the condenser 22 where heat, including the latent heat of vaporization, is rejected from the further compressed air 53 flowing through the path 62 to the expanded compressed air 65 flowing through the coolant path 66. Having recovered heat energy that was originally extracted in the condenser 62, the expanded compressed air 65 is then directed to the turbine 15. The expanded compressed air is further expanded in the turbine 15 to cool the expanded compressed air 65 and to power the compressor 16. In this regard, it should be understood that the turbine 11 and fan 12 rotate independently from the rotation of the turbine 15 and the compressor 16, i.e., there is no rotating engagement between the first and second air cycle machines 9 and 10. The further expanded compressed air exits the turbine 15 as conditioned air 67 that can be directed to a load and/or to additional components for additional conditioning.

The bypassing control valves 30 and 32 can be modulated by a suitable control system (not shown) to control the expansion ratio and outlet temperatures of the turbines 11 and I 5, respectively. In this regard, it may be preferred in some applications that the valves 30 and 32 be capable of bypassing the total compressed air flow under certain operating conditions to selectively disable either, or both, of the air cycle machines 9 and 10.

The bypassing check valve 26 allow the compressed air 48 to bypass the compressor 16 when the compressor 16 is inactive or providing only nominal additional pressurization to the compressed air 48.

In most applications, for optimized performance of the environmental control system 8, the compressor 16 will require more energy than the fan 14, and accordingly, the turbine 15 will extract more energy from the compressed air flow than the turbine 11 and the expansion ratio across the turbine 11 will be less than the expansion ratio across the turbine 15. For example, in some applications, it will be optimum for the turbine 11 to receive 20% to 40% of the energy extracted from the compressed air flow by expansion, with the turbine 15 receiving the remainder of the energy extracted from the compressed air flow by expansion. By utilizing the turbine 11 with its typically lower expansion ratio in the dehumidification loop 34, the system 8 can allow for the expanded compressed air 65 from the first turbine 11 to be maintained at a sufficiently high temperature to avoid icing within the flow path 66 to the condenser 22. While it is preferred to configure the system 8 to avoid icing in the condenser 22 under normal operating conditions, it may be advantageous in some applications to allow for icing in the condenser under normal operation and to provide a condenser that can accommodate such icing.

Additionally, by associating the turbine 11 that drives the fan 12 with the dehumidification loop 34, and by further providing the bypass control valve 28, the system 8 can accommodate changes in ambient and operating conditions which could otherwise reduce overall system performance and efficiency. For example, when the pressure of the compressed air 48 from the compressed air supply 46 is insufficient to provide an adequate mass flow rate of conditioned air 67 from the environmental control system 8, the bypassing control valve 28 can be modulated by a suitable control system to bypass some or nearly all (up to approximately 95%) of the further compressed air 53 around the dehumidification loop 34 by directing the further compressed air 53 to the turbine 15 without first passing the further compressed air 53 through the dehumidification loop 34. In aircraft applications, it will typically be desirable to configure the bypass control valve 28 to bypass a majority of the further compressed air 53 when the aircraft is at cruise altitudes where the pressure and humidity of the compressed air 48 are low as a result of the low pressure and humidity of the external ambient air. Because, the further compressed air 53 is bypassed around the dehumidification loop 34, the air 53 does not experience the pressure drop associated with the dehumidification loop 34 and a greater mass flow rate of conditioned air 67 from the system 8 can be achieved. Further, in most applications this phenomena will be enhanced by the less restrictive nozzle flow area of the turbine 15 resulting from its previously discussed greater expansion ratio. For example, in many applications the nozzle flow area of the turbine 15 will be approximately double the nozzle flow area of the turbine 11 for optimum performance. This allows for an increased mass and flow rate (approximately 15% in comparison to the system 8 without bypassing) through the system under conditions when the compressed air supply pressure is low, such as at cruise altitudes in an aircraft.

While a preferred form of the environmental control system 8 is shown in the FIGURE, it will be appreciated by those skilled in the art that there are many possible manifestations of the invention. For example, while it is preferred to have both the primary and secondary heat exchangers 19 and 20, in some applications it may advantageous to eliminate one of the heat exchangers 19 or 20. As another example, while it is preferred that the fan 12 be driven directly by the turbine 11 through the shaft 13, and that the compressor 16 be driven directly by the turbine 15 through the shaft 17, it may be advantageous in some applications to provide a different drive mechanism, such as a gear train, in place of either of the drive shafts 13 and 17. As yet another example, while it is preferred that the system include the reheater 21, it may be advantageous in some systems to eliminate the reheater 21. Similarly, while it is preferred to provide a fan 12 that supplements the ambient air flow through the heat exchangers 19 and 20, it may be advantageous in some applications to eliminate the fan 12 and to utilize the power extracted from the turbine 11 to drive another component, such a generator. As another example, while the flow path 40 of the secondary heat exchanger 20 is shown upstream of the flow path 42 of the primary heat exchanger it may be advantageous in some applications for the flow path 40 to be downstream of the flow path 42, or for the flow paths to be in parallel, rather than in series. Similarly, while it is preferred for ambient air to be used for the cooling of the primary and secondary heat exchangers 19 and 20, it may be advantageous in some applications to utilize a different cooling medium, such as a fuel flow. While the reheater 21, condenser 22 and water collector 24 are illustrated as separate components, it is possible to incorporate one or more of these components together in a unitary construction.

It will be appreciated that the disclosed air cycle and environmental control system 8 allows for optimization of each of the air cycle machines 9 and 10, which can be advantageous for certain applications, such as small regional aircraft. Optimization of the air cycle machines 9 and 10 can considerably improve the performance of the condensing cycle for such applications in comparison to more conventional environmental control system such as disclosed in U.S. Pat. No. 5,086,622 issued Warner. For example, the system 8 can allow for the turbine 11 to utilize a relatively small hub diameter that allows for higher blade heights and increased efficiency. By way of further example, the system 8 can allow for the exhaust losses of the turbine 11 to be reduced thereby providing a higher turbine efficiency for the turbine 11 in comparison to a four-wheel air cycles machine such as in U.S. Pat. No. 5,086,622.

What is claimed is:

1. An environmental control system for conditioning water-vapor bearing compressed air for supply as conditioned air, the system comprising:

a compressor to further compress said compressed air and to deliver the further compressed air to the system;

a condenser downstream of the compressor to receive the further compressed air and to condense at least a portion of the water-vapor in the further compressed air to deliver dehumidified compressed air to the system;

a first turbine downstream of the condenser to receive the dehumidified compressed air and to expand the dehumidified compressed air to cool the dehumidified compressed air; and a second turbine downstream of the first turbine to receive the expanded dehumidified compressed air, the second turbine rotatable independent of rotation of the first turbine to further expand the expanded dehumidified compressed air to cool the expanded dehumidified compressed air and to power the compressor.

2. The environmental control system of claim 1 further comprising a water collector upstream of the first turbine to remove condensed water from the flow of dehumidified compressed air to the first turbine.

3. The environmental control system of claim 2 further comprising a heat exchanger downstream of the water collector and upstream of the first turbine to transfer heat to the dehumidified compressed air from the further compressed air flowing to the condenser.

4. The environmental control system of claim 1 further comprising:
    a fan powered by the first turbine to produce a cooling air flow; and
    at least one heat exchanger upstream of first turbine to reject heat to the cooling air flow from at least one of the compressed air and the further compressed air.

5. The environmental control system of claim 1 further comprising a bypass valve upstream of the condenser and the first turbine to selectively bypass a majority of the further compressed air to the second turbine without first passing the majority of the further compressed air through the condenser and the first turbine.

6. A method for conditioning water vapor bearing compressed air for supply as conditioned air, comprising the steps of:
    further compressing said compressed air in a compressor;
    condensing and removing water vapor from the further compressed air to dehumidify the further compressed air;
    expanding the dehumidified air through a first turbine to cool the dehumidified air to a first temperature;
    rejecting heat from said further compressed air to said expanded dehumidified air in said condensing step; and
    after said rejecting heat step, further expanding said expanded dehumidified air through a second turbine to cool said expanded dehumidified air to a second temperature and to power said compressor in said further compressing step in the absence of rotating engagement between the first and second turbines.

7. The method of claim 6 further comprising the step of cooling at least one of said compressed air and said further compressed air in at least one heat exchanger prior to said condensing step.

8. The method of claim 7 further comprising the step of powering a fan with the first turbine to draw a cooling air flow through the heat exchanger in said step of cooling.

9. The method of claim 6 further comprising the step of selectively directing a majority of said further compressed air to said second turbine to be expanded therein without said majority of said further compressed air undergoing the condensing step and the step of expanding the dehumidified air through a first turbine.

10. A method for conditioning water vapor bearing compressed air for supply as conditioned air, comprising the steps of:
    using a first air cycle machine including a first turbine powering a fan;
    using a second air cycle machine including a second turbine powering a compressor;
    flowing said compressed air first through the compressor, second through the first turbine, and third through the second turbine in the absence of rotating engagement between said first and second air cycle machines.

11. The method of claim 10 further wherein said flowing step further comprises flowing the compressed air through a condenser after the compressed air has flowed through the compressor and before the compressed air flows through the first turbine.

12. The method of claim 11 further comprising the step of selectively directing a majority of the compressed air flow from the compressor to the second turbine without flowing said majority of the compressed air flow through the condenser and the first turbine.

* * * * *